United States Patent
Curley, Jr. et al.

(10) Patent No.: US 6,997,814 B2
(45) Date of Patent: Feb. 14, 2006

(54) LONG BARREL T-NUT

(75) Inventors: William J. Curley, Jr., Waterbury, CT (US); James F. Norkus, Waterbury, CT (US); James A. Head, Orion, MI (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 10/943,342

(22) Filed: Sep. 17, 2004

(65) Prior Publication Data

US 2005/0031435 A1 Feb. 10, 2005

Related U.S. Application Data

(62) Division of application No. 10/350,632, filed on Jan. 24, 2003, now abandoned.

(60) Provisional application No. 60/355,238, filed on Feb. 8, 2002.

(51) Int. Cl.
*B21D 53/24* (2006.01)

(52) U.S. Cl. .................... 470/18; 470/25; 470/26; 470/89; 470/91

(58) Field of Classification Search .............. 470/18, 470/20, 21, 25, 26, 87, 89, 91, 96; 72/348, 72/349, 356
See application file for complete search history.

(56) References Cited

U.S. PATENT DOCUMENTS

| | | | | |
|---|---|---|---|---|
| 2,743,518 | A | * 5/1956 | Zahodiakin | .............. 72/332 |
| 3,021,537 | A | * 2/1962 | Hughes | .............. 470/18 |
| 4,911,592 | A | 3/1990 | Muller | .............. 411/181 |
| 5,503,596 | A | * 4/1996 | Nagayama | .............. 470/25 |
| 5,618,144 | A | 4/1997 | Leistner | .............. 411/427 |
| 5,863,164 | A | 1/1999 | Leistner | .............. 411/181 |
| 5,993,320 | A | * 11/1999 | Selle | .............. 470/26 |
| 6,095,738 | A | 8/2000 | Selle | .............. 411/427 |
| 6,139,237 | A | * 10/2000 | Nagayama | .............. 411/181 |
| 6,511,274 | B1 | 1/2003 | Nagayama | .............. 411/179 |
| 2003/0185645 | A1 | 10/2003 | Leistner | .............. 411/188 |

* cited by examiner

*Primary Examiner*—Ed Tolan
(74) *Attorney, Agent, or Firm*—Mark W. Croll; Paul F. Donovan

(57) ABSTRACT

An elongated T-nut fastener is formed from a single piece of material. The fastener includes a barrel and a flange, with a threaded portion in the barrel and an unthreaded portion beyond the threaded portion. Fastening sites are provided at spaced locations along the length of the fastener.

14 Claims, 2 Drawing Sheets

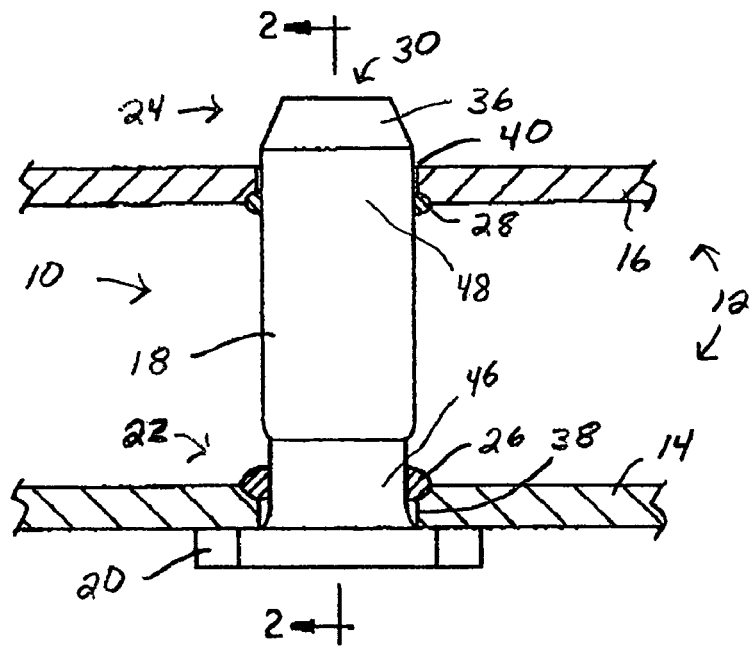
Fig. 1
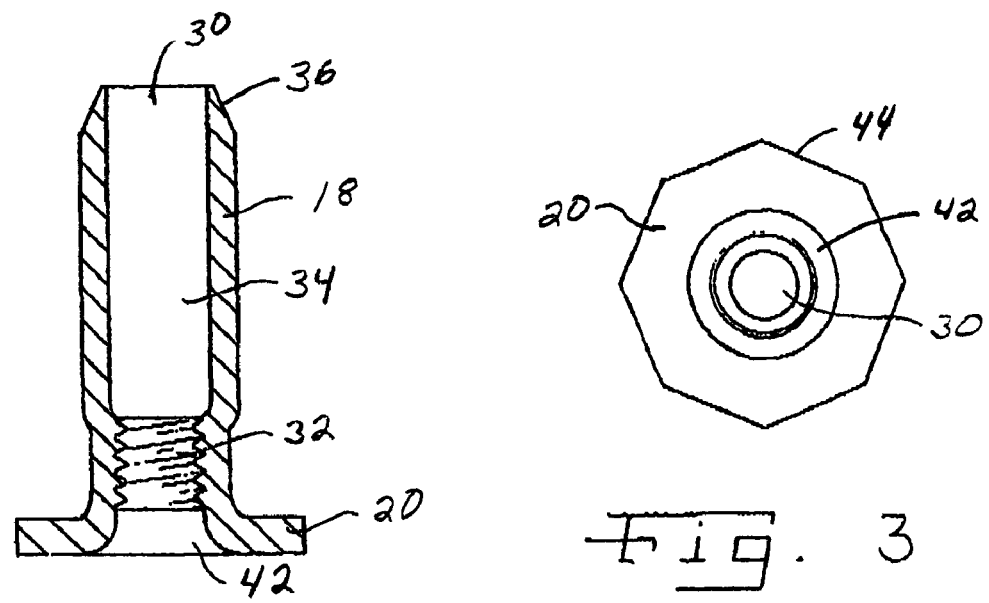
Fig. 2
Fig. 3

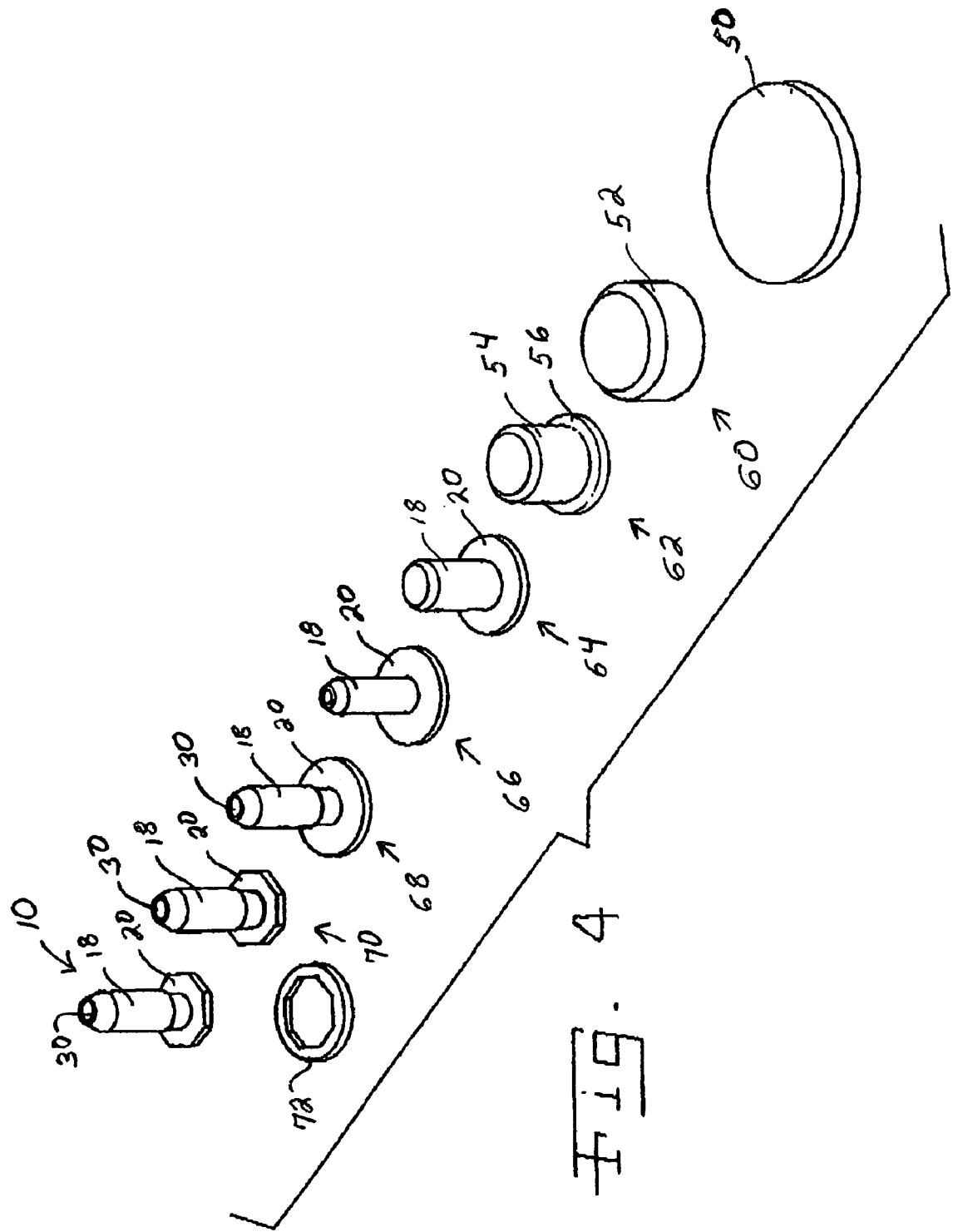

LONG BARREL T-NUT

CROSS REFERENCED TO RELATED APPLICATION

This is a Divisional Application of U.S. application Ser. No. 10/350,632 now abandoned filed on Jan. 24, 2003, which claims the benefit to U.S. Provisional Application No. 60/355,238 filed on Feb. 8, 2002.

FIELD OF THE INVENTION

The present invention relates generally to fasteners and, more particularly, to heavy duty T-nuts having a barrel and a flange adapted for attachment to automobile frames and the like.

BACKGROUND OF THE INVENTION

T-nut fasteners are known for use in various applications, and include a tubular barrel with a peripheral flange at one end thereof. The bore of the barrel is provided with threads to engage threads of a shaft such as from a bolt. The flange can be secured to other structures, so that the T-nut serves as an anchor for attaching other components via a bolt tightened to the T-nut.

T-nut fasteners have been known for use in the automotive industry, for example, as anchors secured to frame members to which other components, such as seats, suspensions, engine components, etc., can be secured. For these and other similar uses, the T-nut must be strong and heavy duty. Advantageously, a T-nut fastener has a long barrel for securing to other structures along an extended length or at multiple sites along the length of the barrel. Again, by way of example, some uses in the automotive industry advantageously apply an elongated barrel attached to two frame members, one near the flange of the T-nut and a second spaced therefrom along the length of the barrel. By welding the T-nut to each of the frame members, the T-nut also functions to tie together the separate frame members, thereby stiffening the frame assembly and reducing frame and fastener noise during operation of the vehicle.

For strength and fit, an elongated T-nut should be provided with consistent wall thickness. To extend between separate frame members, the barrel has to be long, perhaps many times longer than the required thread length within the bore. Commercial advantages are obtained if the T-nut can be manufactured consistently to meet the size and strength requirements in an efficient, cost effective manner.

T-nuts as described above can be made by initially manufacturing the barrel and flange as separate pieces. Conventional pipe forming techniques can be used to make the barrel, and plate-forming techniques can be used to make the flange. With appropriate fixtures, the plate is positioned around the barrel and welded thereto. Manufacturing T-nuts in this manner is costly.

Another technique by which t-nuts as described can be manufactured is by machining. A block of material can be machined to have the desired barrel length and shape, as well as flange size and positioning along the barrel. However, manufacture in this way is time consuming and costly, and is wasteful of material, adding significantly to the overall cost for the T-nut fastener.

There is a need in the art for an elongated T-nut fastener that is strong and can be manufactured consistently in a cost-effective manner.

SUMMARY OF THE INVENTION

The present invention provides an elongated T-nut fastener manufactured in one piece by drawing techniques. Alternatively, a cold heading process can be utilized.

In one form thereof, the present invention provides an elongated fastener for attachment to a supporting structure. The fastener is a monolithic body including a flange and a barrel formed from a single piece. The barrel has a bore therethrough and first and second ends. The first end is adjacent to the flange. The barrel has a threaded portion in the bore near one of the ends and a non-threaded portion extending from the threaded portion to the other of the ends. First and second attachment sites are spaced from each other along the barrel for attaching the fastener to the supporting structure. Alternatively, a first attachment site can be located along the barrel and a second attachment site can be located adjacent the flange.

In another form thereof, the present invention provides a method of forming a monolithic T-nut having a barrel and a flange. The method has steps of; providing a disk shaped blank of material; cupping the blank to form a cup; drawing a portion of the cup and forming a pre-barrel and a pre-flange from the cup; redrawing the cup to achieve a desired barrel length with a flange at an end thereof; piercing an end of the barrel; and threading at least a portion of the barrel.

In still another form thereof the present invention provides a T-nut fastener with a monolithic body shaped to form a barrel and a flange at one end of the barrel. The barrel has a bore extending therethrough, with at least a portion of the length of the bore being threaded for engaging a threaded shaft. At least two spaced sites along the body are adapted for attachment to structures by welding.

An advantage of the present invention is providing a one-piece T-nut fastener including an elongated barrel and a flange at one end of the barrel.

Another advantage of the present invention is providing an elongated, strong T-nut fastener that can be manufactured consistently in a cost efficient manner.

Still another advantage of the present invention is providing a T-nut fastener having sufficient strength to be used as an anchor for components in an automobile and has sufficient length to extend between two or more frame members.

Yet another advantage of the present invention is providing an elongated T-nut that can be wielded at separate locations along the length thereof to appropriate supporting structure, including automotive frames.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is an elevation, partial cross-sectional, view of a T-nut fastener according to the present invention, shown secured between two supporting structures;

FIG. 2 is a cross-sectional view of the T-nut fastener shown in FIG. 1, taken along line 2—2 of FIG. 1;

FIG. 3 is an end view of the T-nut fastener shown in the previous Figures; and

FIG. 4 is a sequential illustration of the manner in which a T-nut fastener in accordance with the present invention can be manufactured, showing the starting material, a finished T-nut fastener of the present invention, and the structure at several intermediate stages of manufacture.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising" and variations thereof is meant to encompass the items listed thereafter and equivalents thereof as well as additional items and equivalents thereof.

DETAILED DESCRIPTION OF THE PREFERRED EMBODIMENT

Referring now more specifically to the drawings, and to FIG. 1 in particular, a T-nut fastener 10 in accordance with the present invention is shown mounted in a supporting structure 12. Supporting structure 12 can be, for example, an automotive frame including a first supporting or frame member 14 and a second supporting or frame member 16. While use as described herein in an automobile frame is a particularly advantageous application of the present invention, it should be understood that an elongated T-nut fastener 10 in accordance with the present invention can also be used in other structures and for other purposes.

T-nut fastener 10 includes a barrel 18 and a flange 20. First frame member 14 and second frame member 16 are secured to T-nut fastener 10 at spaced locations along barrel 18. Barrel 18 includes a first barrel end 22 and a second barrel end 24. Flange 20 is provided at first barrel end 22, and second barrel end 24 comprises a distal end of T-nut fastener 10 and barrel 18.

T-nut fastener 10 is a monolithic structure formed from a single piece of metal such as steel or the like in a manufacturing method to be described subsequently herein. As a one piece, monolithic structure, T-nut fastener 10 is strong and provides stiffening between first and second frame members 14 and 16. T-nut fastener 10 can be secured to first and second frame members 14 and 16 by first and second welds 26 and 28, respectively. Welds 26 and 28 can be continuous beads of weld between barrel 18 and first and second frame members 14 and 16, respectively, or each may comprise a plurality of spot welds or projection welds between barrel 18 and first and second frame members 14 and 16. Although not shown, with reference to FIG. 1, it should be noted that frame member 14 can be positioned on the opposite side of flange 20. Welds like welds 26 and 28 can be used to secure the frame member 14 to the flange 20 in accordance with the foregoing description.

Barrel 18 is an elongated tubular structure having a bore 30 extending therethrough. Bore 30 includes a threaded portion 32 (FIG. 2) adapted to engage threads of a male threaded fastener component (not shown), such as the threaded shaft of a bolt or the like. Those skilled in the art will recognize that threaded portion 32 can also receive threaded segments of specialty fasteners or fixtures, rather than conventional bolts.

A T-nut fastener 10 of the present invention can be provided with a barrel 18 of significantly longer length than is required for threaded portion 32. The added length of barrel 18 allows T-nut fastener 10 to extend between first and second frame members 14 and 16 spaced a significant distance from each other. Bore 30 can be provided with the threaded portion 32 substantially the entire length thereof.

Since the added length of barrel 18 is not required for anchoring a male threaded fastener (not shown), but instead only for allowing T-nut fastener 10 to extend between first frame member 14 and second frame member 16, additional thread length provides no advantage and can complicate final assembly. The present invention provides an advantageous structure in which the distal portion of barrel 18 beyond threaded portion 32 is of a diameter greater than the diameter of threaded portion 32. Both the inner diameter and outer diameter of a non-threaded, bulged portion 34 (FIG. 2) are greater than the inner diameter and outer diameter, respectively, of threaded portion 32. Thus, a male threaded fastener secured through treaded portion 32 can extend into bulged portion 34 without interference from the walls thereof forming bore 30.

Second barrel end 24 can be provided with a tapered tip 36. Thus, T-nut fastener 10 can be readily directed into the second hole 40 of the second frame member 16 or into the first and second holes 38 and 40 formed in the first frame member 14 and second frame member 16, respectively.

Flange 20 is formed at first barrel end 22 and extends peripherally therefrom beyond the outer diameter of barrel 18. Flange 20 prevents T-nut fastener 10 from being pulled through first hole 38 of first frame member 14. As noted, alternatively, frame member 14 can be positioned on the opposite side of flange 20 for attachment thereto. Flange 20 forms a tapered entrance 42 (FIGS. 2 and 3) leading to threaded portion 32 of barrel 18. Tapered entrance 42 thereby readily directs a male threaded fastener (not shown) to threaded portion 32, aiding in proper alignment and orientation for threaded engagement.

An outer periphery 44 (FIG. 3) of flange 20 is cut or otherwise shaped as desired, which may be round or flat sided for engagement by tools or fixtures during use of T-nut fastener 10.

The outer surface of barrel 18 is provided with first and second attachment sites 46, 48 at spaced locations along barrel 18, at which fastener 10 is attached to supporting structure 12. Attachment sites 46, 48 can be as simple as suitable surface finishes for welding, or can include the formation of weld projections or other structure to facilitate and promote attachment of fastener 10 to first and second frame members 14, 16.

T-nut fastener 10 of the present invention is manufactured by eyelet drawing techniques. Drawing is understood to mean a metal forming process in which a given quantity of material is processed through a series of punches and dies to form an object. In contrast to other forming processes, such as die stamping, a drawing process utilizes free blanking. A flat, free piece of metal, referred to herein as a blank, is forced into a first die cavity to begin shaping the part. Progressive die cavities, or eyelets are used with different punches to further form the part, each progressive drawing step more closely approaching the desired completed shape. Heretofore, drawn metal processing has been used primarily for the formation of small parts on light tonnage presses. High draw ratios (length of a part or section relative to the diameter of the part or section) were avoided particularly when cracks or excessive wall thinning is a concern.

FIG. 4 illustrates sequential, intermediate components by which T-nut fastener 10 is manufactured by eyelet drawing from an initial blank disk 50. Blank disc 50 is provided in sufficient diameter and thickness to form T-nut fastener 10 as a single piece. Blank disk 50 is first shaped to form an intermediate cup structure 52. Cup 52 is processed through a drawing eyelet procedure to form an initial pre-barrel 54 and pre-flange 56. Through progressive drawing steps, pre-barrel 54 and pre-flange 56 progressively approach the final shapes required for barrel 18 and flange 20. Alternatively, it is noted that a similar cold heading process could be utilized in making the T-nut fastener 10.

As illustrated in FIG. 4, a cupping step 60 pre-shapes disk 50 from flat disk 50 to cup 52. An initial drawing step 62 forms cup 52 in the general shape required, including pre-barrel 54 and pre-flange 56. A single redrawing step 64 is shown in FIG. 4 prior to a piercing step 66 that opens bore 30 throughout the length of fastener 10. However, those skilled in the art will recognize that several re-drawing steps may be required to achieve the desired length and shape for barrel 18 and flange 20. For, example, a T-nut fastener 10 has been manufactured according to the present process with seven steps, including initial drawing step 62 and redrawing step 64 following cupping step 60 and preceding piercing step 66. The exact number of drawing steps required will varying, depending on the size and shape of fastener 10 being made, the material from which it is made, and the capabilities of the drawing equipment used in making it.

To complete fastener 10, a punch is inserted in a bulging step 68 to form bulged portion 34 outwardly of threaded portion 32, and a tap is used to form threaded portion 32. The periphery of flange 20 is shaped as desired in a clipping step 70, leaving a remnant 72.

One fastener manufactured in accordance with the method above has an overall length of 72.0 mm, with a flange thickness of 6.0 mm and a barrel length of 66 mm. The barrel outer diameter of bulged portion 34 is 24.3 mm. The threaded portion length is 13.35 mm. Another fastener manufactured in this way has an overall barrel length of 80 millimeters and an outer diameter of 21.5 millimeters at bulged portion 34. The length of threaded portion 32 is 13.35 millimeters, leaving an unthreaded length in barrel 18 of 66.65 millimeters. The thickness of flange 20 is 7.2 millimeters. Still another embodiment of the invention has a barrel length of 50.0 mm, a barrel outer diameter of 19.0 mm and a flange thickness of 6.0 mm. A similar further embodiment has a barrel diameter of 21.0 mm.

The present invention provides a strong, elongated, monolithic T-nut fastener suitable for anchoring between structural components by welding along the length of the barrel. The T-nut fastener can be manufactured efficiently, consistently and cost effectively. Manufacturing by drawing techniques reduces manufacturing time and minimizes waste that occurs in machining. Greater accuracy in wall thickness is achieved, and stresses induced by welding the barrel and flange are eliminated. The result is a stronger, more accurate and less costly T-nut as compared with T-nuts manufactured by other techniques.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A method of forming a monolithic T-nut having a barrel and a flange for use in a support structure having a first supporting member and a spaced apart second supporting member, said method comprising steps of;
    providing a disk shaped blank of material;
    cupping the blank to form a cup;
    drawing a portion of the cup and forming a pre-barrel and a pre-flange from the cup;
    redrawing the cup to achieve a desired barrel length with a flange at an end thereof;
    piercing an end of the barrel;
    threading at least a portion of the barrel;
    bulging a non-threaded end portion of the barrel, such that an inner diameter and an outer diameter of the bulging portion of the barrel are greater than an inner diameter and an outer diameter, respectively, of the threaded portion of the barrel; and
    securing the barrel to support structure said securing step including securing the bulging portion of the barrel to one of the first and second supporting members, and securing at least one of the threaded portion of the barrel and the flange to the other of the first and second supporting members.

2. The method of claim 1, including cutting the flange to a desired shape.

3. The method of claim 2, said redrawing step including multiple steps of redrawing.

4. The method of claim 1, said threading preformed inside of said barrel.

5. The method of claim 1, including cutting the flange to a desired shape.

6. The method of claim 1, said redrawing step including multiple steps of redrawing.

7. The method of claim 1, wherein said securing step includes welding the bulging portion of the barrel to one of the first and second supporting members, and welding the at least one of the threaded portion of the barrel and the flange to the other of the first and second supporting members.

8. Means for forming a monolithic T-nut having a barrel and a flange for use in a support structure having a first supporting member and a spaced apart second supporting member, said means comprising:
    means for providing a disk shaped blank of material;
    means for cupping the blank to form a cup;
    means for drawing a portion of the cup and forming a pre-barrel and a pre-flange from the cup;
    means for redrawing the cup to achieve a desired barrel length with a flange at an end thereof;
    means for piercing an end of the barrel;
    means for threading at least a portion of the barrel;
    means for bulging a non-threaded end portion of the barrel so as to provide an inner diameter and an outer diameter of the bulging portion of the barrel that are greater than an inner diameter and an outer diameter, respectively, of the threaded portion of the barrel; and
    means for securing the barrel to the support structure, said securing means including means for securing the bulging portion of the barrel to one of the first and second supporting members, and means for securing at least one of the threaded portion of the barrel and the flange to the other of the first and second supporting members.

9. The means of claim 8, including means for cutting the flange to a desired shape.

10. The means of claim 9, said means for redrawing including multiple means of redrawing.

11. The means of claim 8, said means for threading being preformed inside of said barrel.

12. The means of claim 8, including means for cutting the flange to a desired shape.

13. The means of claim 8, said means for redrawing including multiple means of redrawing.

14. The means of claim 8, wherein said means for securing the barrel to the support structure includes means for welding the bulging portion of the barrel to one of the first and second supporting members, and means for welding the at least one of the threaded portion of the barrel and the flange to the other of the first and second supporting members.

* * * * *